(12) United States Patent
Fletcher et al.

(10) Patent No.: US 7,158,653 B2
(45) Date of Patent: Jan. 2, 2007

(54) ENCODING INFORMATION IN A WATERMARK

(75) Inventors: Peter Alleine Fletcher, Rozelle (AU); Kieran Gerard Larkin, Putney (AU)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 10/323,776

(22) Filed: Dec. 20, 2002

(65) Prior Publication Data

US 2003/0123660 A1 Jul. 3, 2003

(30) Foreign Application Priority Data

Dec. 21, 2001 (AU) .................................. PR9706

(51) Int. Cl.
*G06K 9/00* (2006.01)

(52) U.S. Cl. .................................... 382/100

(58) Field of Classification Search ............... 382/100; 713/194; 380/203
See application file for complete search history.

(56) References Cited

U.S. PATENT DOCUMENTS

| | | | |
|---|---|---|---|
| 6,044,156 A | 3/2000 | Honsinger et al. | 380/54 |
| 6,249,614 B1 * | 6/2001 | Kolesnik et al. | 382/251 |
| 6,563,936 B1 * | 5/2003 | Brill et al. | 382/100 |
| 6,671,386 B1 * | 12/2003 | Shimizu et al. | 382/100 |
| 6,678,390 B1 * | 1/2004 | Honsinger | 382/100 |
| 6,700,989 B1 * | 3/2004 | Itoh et al. | 382/100 |
| 6,700,991 B1 * | 3/2004 | Wu et al. | 382/100 |
| 6,786,954 B1 * | 9/2004 | Lee et al. | 106/31.13 |
| 2001/0005397 A1 | 6/2001 | Watanabe | |
| 2001/0028715 A1 * | 10/2001 | Watanabe | 380/203 |
| 2003/0068067 A1 * | 4/2003 | Fielding et al. | 382/100 |
| 2004/0139340 A1 * | 7/2004 | Johnson et al. | 713/194 |

(Continued)

FOREIGN PATENT DOCUMENTS

EP 0 901 102 A2 3/1999

(Continued)

OTHER PUBLICATIONS

"Exploiting Shift Invariance to Obtain a High Payload in Digital Image Watermarking," Maes, et al., IEEE International Conference on Multimedia Computing and Systems, Los Alamitos, CA, 1999, pp. 7-12.

(Continued)

*Primary Examiner*—Bhavesh M. Mehta
*Assistant Examiner*—Utpal Shah
(74) *Attorney, Agent, or Firm*—Fitzpatrick, Cella, Harper & Scinto

(57) ABSTRACT

A method (750) of encoding a value is disclosed. In one implementation the value is encoded into an image (700). The method (750) operates by defining (403) a first ordered set of positions; determining (405) a number of marks for encoding the value in the ordered set of positions; determining (409) a selection of the first ordered set of positions using combinatorial theory with the number of marks and the number of positions in the first ordered set of positions for encoding the value; and placing (411) marks at the selection of the first ordered set of positions. Preferably the value is encoded by encoding a base value and an offset value, the base value is encoded by the number of marks, and the offset value is encoded by the selection of positions. Preferably the marks are basis patterns forming a watermark (710). A method is also disclosed of encoding the number of basis patterns used in the watermark (710), which comprises the steps of defining a further ordered set of positions in the image; and adding a mark to the image at one of the further ordered set of positions, the mark at the one position encoding the number of basis patterns used in the watermark (710).

54 Claims, 11 Drawing Sheets

U.S. PATENT DOCUMENTS

2005/0123169 A1* 6/2005 Wendt .................... 382/100

FOREIGN PATENT DOCUMENTS

| EP | 1 022 678 A2 | 7/2000 |
| EP | 1 148 708 A1 | 10/2001 |
| WO | WO/0111563 | 2/2001 |

OTHER PUBLICATIONS

"Data Embedding Using Phase Dispersion," Honsinger, et al., Eastman Kodak, Rochester NY, 2000, www.kodak.com/US/plugins/acrobat/en/corp/researchdevelopment/dataembedding.pdf.

* cited by examiner

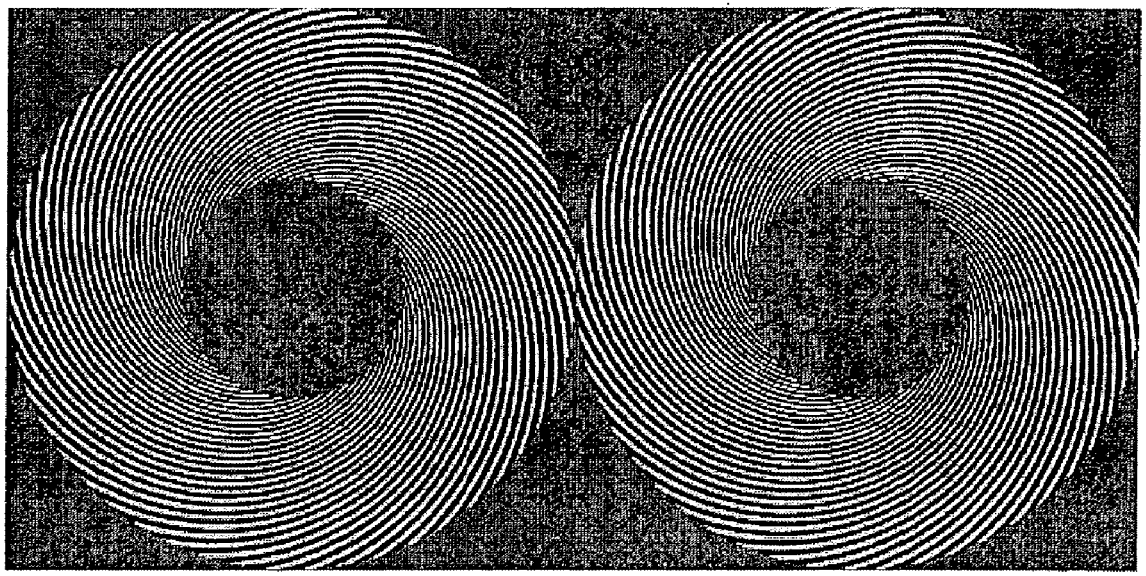
real part        imaginary part
Fig. 8A        Fig. 8B

ENCODING INFORMATION IN A WATERMARK

TECHNICAL FIELD OF THE INVENTION

The present invention relates to embedding multi-bit messages and, in particular, to the embedding of multi-bit messages by embedding a small number of patterns, and the decoding of these messages.

BACKGROUND

With the advent of digital multimedia data and digital multimedia data distribution, protection of such digital multimedia data against unauthorised copying and dissemination have become an issue for multimedia data publishers and authors. One technique used to identify the ownership of an image is to embed a pattern or patterns into the image, such that the embedded pattern is not visible to the naked eye of an observer. Such a pattern is called a watermark. The presence of the watermark can be detected in a copied image by the owner of the original image, thereby proving their ownership.

Systems are known for embedding a pattern or patterns into an image. Several watermarking schemes have also been developed to imperceptibly embed information in an image that may later be retrieved. This embedded information is commonly used to check the provenance of the image, record information about the image that is not directly visible, or even store information totally unrelated to the image.

Such information will remain with the image even if the header and other metadata of the image file are removed. The information may be usefully employed to define the address or location of original metadata related to that image. The metadata may contain owner identification, camera settings, geographical location, details of the subjects in the image, or any number of pieces of other information. The image metadata to which the information provides the address or location of may be stored on the same device as the image, or on a server connected by a network, or even a server owned by a third party on the Internet.

The information stored in a watermark of an image may also be used for fingerprinting, which is used to trace the source of illegal copies. In this case, the owner can embed different information in the copies of the image supplied to different customers. By comparing the information extracted from illegal copies to that added to the copies of the image supplied to customers, the customers who have broken their license agreement by supplying the data to third parties may be identified.

Another use of such information stored in a watermark of an image is to directly control digital recording and playback devices for copy protection purposes. In this case, the watermark can include copy- and playback-prohibit information. A watermark detector in the recording and playback device may use the prohibit information to prohibit copying or playback of such an image.

Yet another reason for using a watermark to store information in an image is simply to hide that information. As watermarks in images are typically imperceptible to the human eye, the presence of such information will be unnoticed by an observer.

A difficulty arises with respect to reliably embedding watermarking patterns in such a way that they are both imperceptible to observers of the image, and also carry enough information to be useful in their intended application area. In general, as more information is embedded in a watermark, the perceptibility of the watermark increases.

SUMMARY

It is an object of the present invention to substantially overcome, or at least ameliorate, one or more disadvantages of existing arrangements.

According to a first aspect of the invention, there is provided a method of encoding a value, said method comprising the steps of:
a) defining a first ordered set of positions;
b) determining a number of marks for encoding said value in said ordered set of positions;
c) determining a selection of said first ordered set of positions using combinatorial theory with said number of marks and the number of positions in said first ordered set of positions for encoding said value; and
d) placing marks at said selection of said first ordered set of positions.

According to a second aspect of the invention, there is provided a method of decoding a value encoded by placing marks at positions selected from a first ordered set of positions, said method comprising the steps of:
a) identifying said first ordered set of positions;
b) detecting said marks at said positions; and
c) decoding said value using combinatorial theory with the number of marks detected and the number of positions in said first ordered set of positions.

According to another aspect of the invention, there is provided an apparatus for implementing any one of the aforementioned methods.

According to another aspect of the invention there is provided a computer program product including a computer readable medium having recorded thereon a computer program for implementing any one of the methods described above.

BRIEF DESCRIPTION OF THE DRAWINGS

One or more embodiments of the present invention will now be described with reference to the drawings, in which:

FIGS. 8A and 8B show the real and imaginary parts respectively of a typical basis pattern of the preferred form.

DETAILED DESCRIPTION

Figure 1:
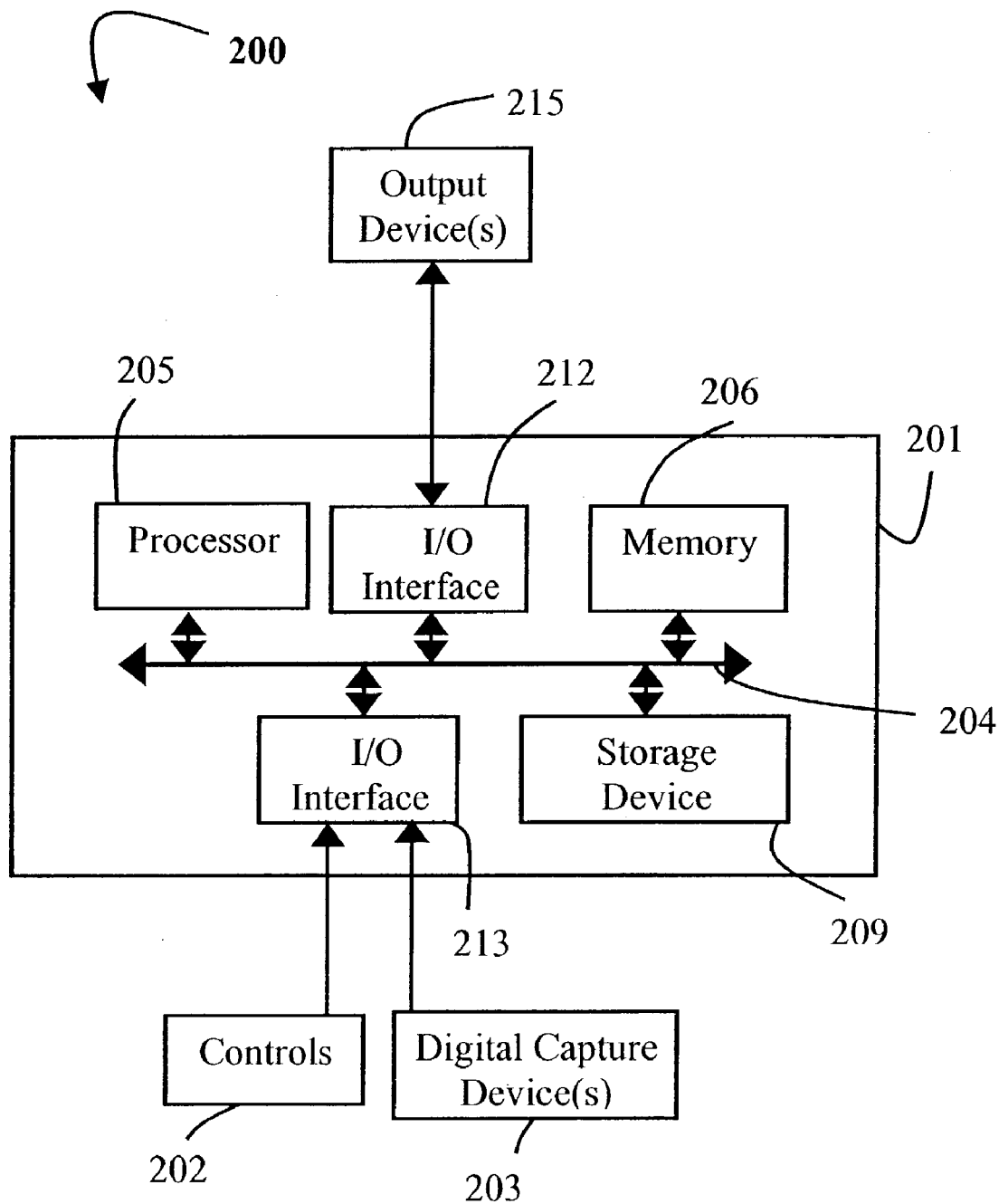
FIG. 1 shows a schematic block diagram of a system for the encoding and decoding of an imperceptible message.

Where reference is made in any one or more of the accompanying drawings to steps and/or features, which have the same reference numerals, those steps and/or features have for the purposes of this description the same function(s) or operation(s), unless the contrary intention appears.

Watermarking, and in particular the encoding and decoding of an imperceptible message, may be practiced using a system 200, a schematic block diagram of which is shown in FIG. 1. The system 200 may, for example, be a general-purpose computer, a digital camera, a video camera, a scanner, a photocopier or a digital recording device. The system 200 comprises a computer module 201, output device(s) 215 and input devices such as controls 202 and digital capture device 203. The digital capture device 203 may be an image sensor, such a two-dimensional CCD array. The computer module 201 typically includes at least one processor unit 205, a memory unit 206, for example formed from semiconductor random access memory (RAM) and read only memory (ROM), input/output (I/O) interface(s) and a mass storage device 209, such as a magnetic hard disk or a magneto-optical disk. The components 205 to 213 of the computer module 201, typically communicate via an interconnected bus 204 and in a manner which results in a conventional mode of operation of the computer system 200 known to those in the relevant art.

Figure 2:
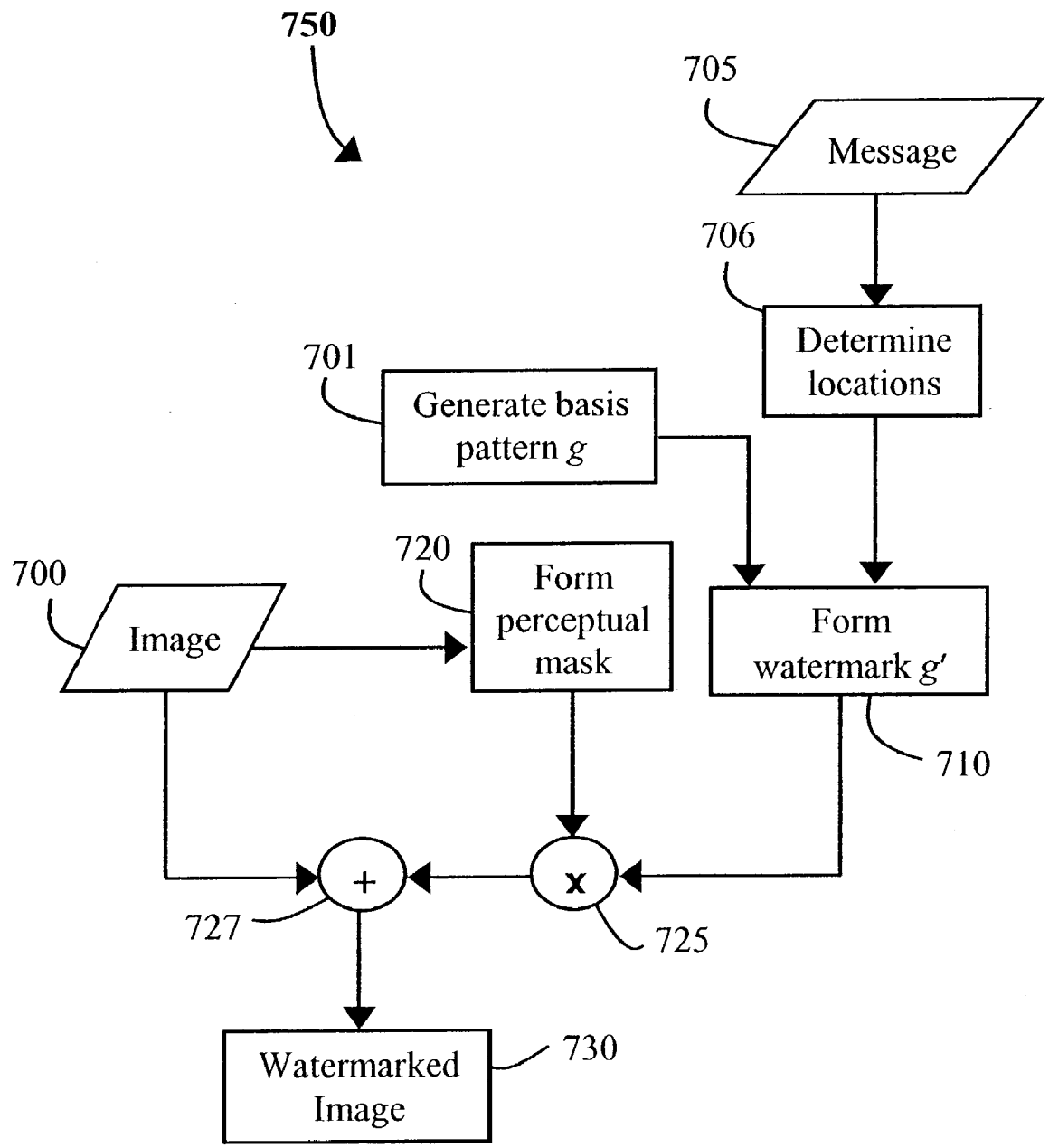
FIG. 2 shows a schematic diagram of a process of watermarking an image with an encoded message.

In the case where the system 200 is a general-purpose computer, the output device 215 generally includes a display device. A printer may also be provided. The controls 202 include a keyboard and a mouse. The storage device 209 typically includes a hard disk drive, a floppy disk drive and a CD-ROM drive. Typically, the watermarking is controlled by an application program which is resident on the storage device 209. The application program is read and controlled in its execution by the processor 205. Intermediate storage of the program may be accomplished using the semiconductor memory 206, possibly in concert with the storage device 209. In some instances, the application program may be supplied to the user encoded on a CD-ROM or floppy disk and read via a CD-ROM drive or floppy disk drive 211, or alternatively may be read by the user from a network (not illustrated). FIG. 2 shows a schematic diagram of a process 750 of encoding a message 705 into an image 700 through the adding of a watermark g' to the image 700 to form a watermarked image 730. The image 700 may be obtained by the system 200 using the digital capture device(s) 202 or through the storage device 209. The process 750 may be implemented on the system 200 shown in FIG. 1 as software executing within the system 200, where the process 750 is effected by instructions in the software that are carried out by the processor 205 of the system 200.

The watermark g' is formed from a basis pattern g. The basis pattern g is preferably mathematically generated by the processor 205 in step 701 through the use of a basis pattern equation and parameters of the basis pattern g.

The watermark g' that is embedded into an image 700 generally consists of a summation of separate copies of the basis patterns g, with each copy being embedded at a translation $(x_k, y_k)$:

$$g'(x,y) = \delta \cdot \sum_{k=1}^{K} g(x - x_k, y - y_k) \quad (1)$$

where δ is a constant embedded factor used to make the watermark g' component in the watermarked image 730 invisible or imperceptible to the human visual system under normal viewing conditions. If the basis patterns g are symmetrical, then each translation $(x_k, y_k)$ corresponds to a centre-point of the basis patterns g.

The message 705 may be any message representable as a bit string and is encoded into the image 700 by means of the watermark g', with the bit string being encoded into the image 700 using the translations $(x_k, y_k)$ of the added copies of the basis pattern g. Accordingly the message 705 is used in step 706 by the processor 205 to determine the translations $(x_k, y_k)$ of the copies of the basis pattern g. Step 706 will be described in detail below. Once the processor 205 has determined the translations $(x_k, y_k)$ of the copies of basis pattern g, the watermark g' is formed in step 710 by the processor 205 using Equation (1). The watermark image g' is also stored in memory 206.

The watermark g', if simply added to the image 700, may still be visible in regions of low intensity variation, such as "flat" sky regions. Accordingly, an adaptive scheme is preferably used to further reduce the level of the watermark g' in regions of the image 700 having a low intensity variation and to increase the level of the watermark g' in regions of the image 700 having a high intensity variance. A perceptual mask w(x,y) is formed by the processor 205 from the image 700 in step 720. The perceptual mask w(x,y) may be calculated by estimating a local gradient magnitude of the luminance in the image 700.

The watermark g' is then retrieved from memory 206 and de-emphasised with the perceptual mask w(x,y) by multiplying, in step 725, the pixel values of the perceptual mask w(x,y) with corresponding pixel values of the watermark g' to form a de-emphasised watermark ĝ. The de-emphasised watermark ĝ is then added by the processor 205 to the image 700 in step 727 to form the watermarked image 730. If the image 700 is in color, then the de-emphasised watermark ĝ is added to the luminance part of the color image 700. This allows the watermark to survive when the watermarked image is converted from colour to a greyscale representation. Parts of the de-emphasised watermark ĝ outside the bound of the image 700 are discarded. The watermarked image 730 is thus the same size as that of image 700.

It may be necessary to re-quantise the watermarked image 730 so that the pixel values of the image 730 again fall in a range of [0 . . . 255], which is the range typically used by digital devices to store values. This may be done by direct rounding or some form of dithering, e.g. Floyd-Steinberg error propagation. The watermarked image 730 may be displayed, printed, stored or communicated to other devices.

As set out in relation to step 706 of process 750 (FIG. 2), the message 705 is used to determine the translations $(x_k, y_k)$ of the copies of the basis pattern g. As shall be set out in detail below, correlation of a watermarked image with the basis pattern g used in the watermark, results in correlation magnitude peaks at those translations $(x_k, y_k)$ where the basis pattern g was embedded. Accordingly, by adding a basis pattern g at such a translation $(x_k, y_k)$, a mark is added in the image obtained through correlation, and therefore adding a basis pattern g at a translation $(x_k, y_k)$ is hereafter referred to as adding a mark at image coordinate $(x_k,y_k)$. Step 706 will now be described in more detail with reference to FIG. 4.

Step 706 starts in sub-step 401 where the processor 205 converts the message 705 into a number B of length b bits. For example, the message "2Bit" may be converted into the number:

$$00110010\ 01000010\ 01101001\ 01110100_2 \qquad (2)$$

using the conventional 8-bit ASCII code, which translates to 843213172 decimal. In such a case where the 8-bit ASCII code is used, a complementary decoder, such as the decoder shown in FIG. 3, will know that each letter of the message consists of an 8 bit number.

In an alternative implementation, the message 705 is converted into a string of d bits which is then treated as a number containing d bits. In such a case the bit string has a variable length and such a representation of the message does not distinguish between bit-strings with differing numbers of leading zeroes. For example, the two binary messages 101101 and 00101101 cannot be distinguished, as both binary messages, when treated as numbers, have the value of $45_{10}$.

In order to encode a variable length message as a number, the string of d bits is simply prepended with a binary 1, with the prepended message treated as a number. During decoding, the message may be decoded by reading the marks as a number, and then removing the leading binary 1 from the number to retrieve the encoded string of d bits.

Sub-step 403 follows where the processor 205 defines a set of positions on the image 700, which corresponds to translations $(x_n,y_n)$ where marks may be added to the image 700. A simple scheme for defining the set of positions for the translations $(x_n,y_n)$ is to define an N×N grid in the image 700, with the positions in the grid being identified by their respective array values (i;j), with i,j∈0, . . . , N−1 and grid position (0;0) being the lower left corner grid position. In the preferred implementation, grid positions (0;0), (0;N−1) and (N−1;0) are reserved for alignment marks, and grid position (N−1;N−1) is kept open, as a mark at that position will be confused for an alignment mark. Alignment marks are used to allow reliable registration and alignment of an image and will be described in more detail below. There are thus $N^2-4$ positions provided for adding marks to encode the message 705.

Consider for example an image being 512 pixels in width and 512 pixels in height in which a 100-bit message must be encoded. A 40×40 grid may be chosen for embedding the message. The grid is also chosen to have a total width and total height of 200 pixels each. The grid is centred in the middle of the image at image coordinate (255;255). The three corner grid positions (0;0), (0;39) and (39;0) that are reserved for the alignment marks correspond with image coordinates (158;158), (158;353) and (353;158). Using a single basis pattern g, only one mark may be embedded at each grid position (i;j), leaving a total of (40×40)−4 grid positions for encoding information, or 1596 grid positions.

With the set of positions where marks may be added to the image 700 defined in step 403, the processor 205 proceeds to step 405 where the number of marks r for encoding the number B is determined.

An implementation for encoding a number B with length b bits into the image 700 is to allocate a predetermined grid position (i,j) to each of the b bits of the number B. If a bit of the number B is an 1, then a mark is embedded in translation $(x_k,y_k)$ that corresponds with the grid position, whereas no marks are embedded in translations $(x_k,y_k)$ that correspond with the grid position which in turn corresponds to 0's in the number B. Thus, with this method, the number of marks r for encoding the message is equal to the number of 1 bits in the number B.

In order to improve reliability, a single extra mark and an extra set of grid positions may be used to indicate the number of 1 bits in the number B. For example, to encode an 8 bit message, a group of 8 grid positions may be used to encode the message, and a single mark may be embedded at one of 9 separate grid positions to encode the number of 1 bits used in the 8 bit message, thereby using between 1 and 9 marks to encode 8 bits. Thus, together with the three alignment marks, the total number of marks K embedded into image 700 is between 4 and 12.

The above implementation for encoding the number B into the image 700, while effective, is not very efficient. The number of marks r required for encoding the number B is proportional to the length of the number b in bits. It is desirable to encode the number B using the minimum number of marks r, i.e. adding the minimum number of copies of the basis pattern g to the image 700, thereby ensuring that the watermark is kept as imperceptible as possible.

To use the minimum number of marks possible, numbers are assigned to combinations of marks starting from all combinations with 0 marks, all combinations with 1 mark, and so on while the number of marks r is increased. If the number of positions z available for placing marks is much larger than the message length b of the number B, only a small number of positions (i,j) need to be marked.

Using r marks with z available grid positions (i,j) for embedding those marks, by combinatorial analysis it can be shown that there are:

$$^zC_r = \frac{z!}{r!(z-r)!} \qquad (3)$$

combinations of grid positions (i,j) available for embedding those marks. When the number of available grid positions z is large and the number of message marks r is small, then the combinations of grid positions (i,j) available approximates $z^r/r!$, which is significantly larger than either the number of available grid positions z or the number of message marks r.

By assigning a separate number to each possible combination for embedding r or fewer marks, any number between 1 and $$\sum_{i=0}^{r} \frac{z!}{i!(z-i)!} \qquad (4)$$

may be encoded. For example, with 1600 available grid positions and up to 10 marks, there are 29,643,848,128,206, 309,473,068,360 combinations of marks, which is an 85-bit number. Thus, using up to 10 marks and 1600 available grid positions, any number B containing between 0 and 84 bits can be encoded into an image.

Figure 5A:
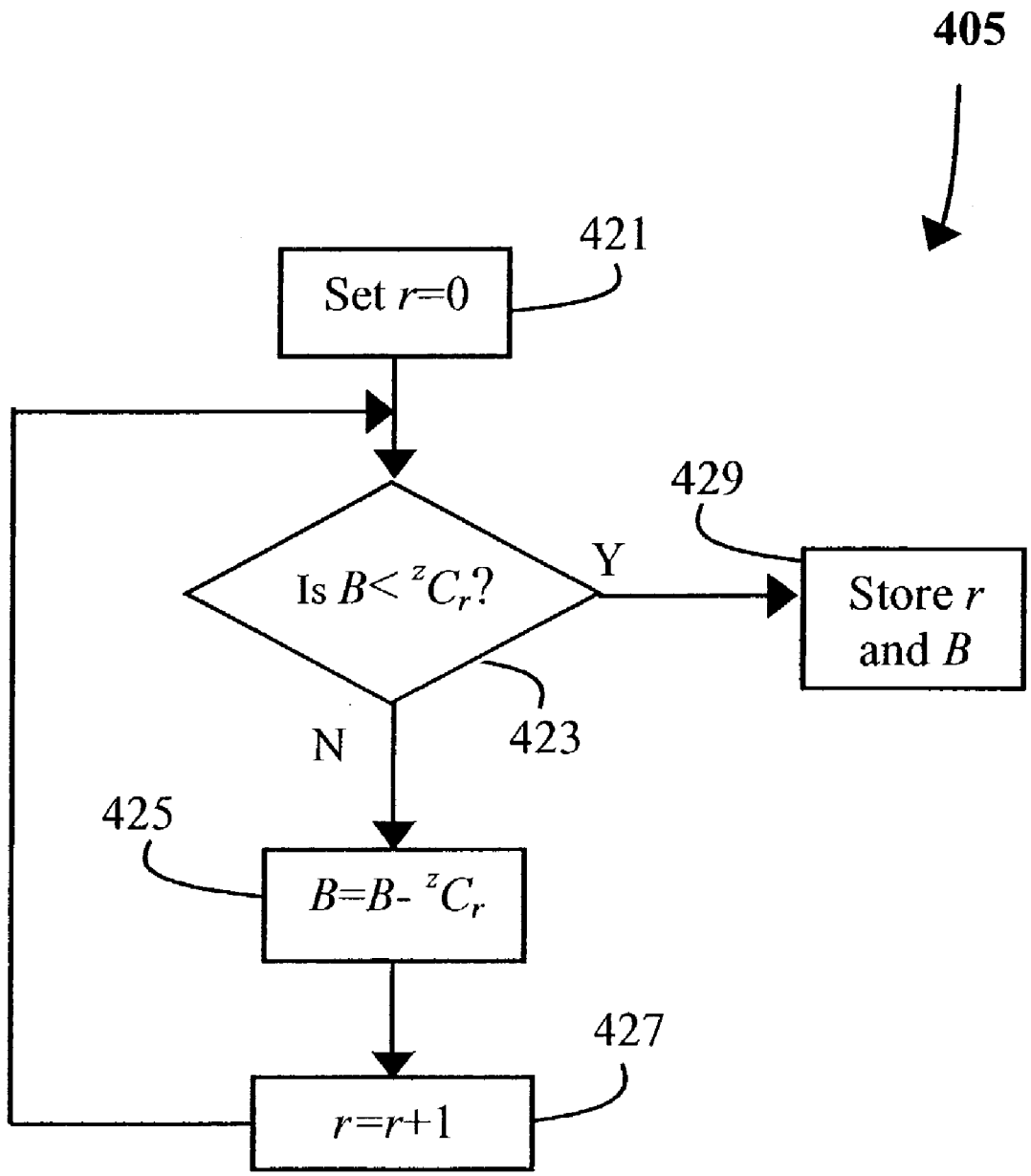
FIGS. 5A and 5B show schematic diagrams of the steps to calculate the number of marks required for encoding a number.

FIG. 5A shows a schematic flow diagram of the preferred sub-steps for step 405 where the number of marks r for encoding the number B with z available grid positions is determined by the processor 205. In this implementation, the number B may be formed by addition of a lower bound number and an offset number, with the lower bound number being encoded by the number of message marks r such that the lower bound number is simply:

$$\sum_{i=0}^{r-1} \frac{z!}{i!(z-i)!} \quad (5)$$

The offset number is then encoded by the specific placement of the r message marks.

In sub-step 421 the number of marks r is initially set to 0. The processor 205 then determines in step 423 whether the number B is smaller than $^zC_r$, which is the number of combinations of grid positions (i,j) available for embedding the r marks in z possible positions, or the largest number that can be encoded with the r marks. If it is determined in sub-step 423 that the number B is not smaller than $^zC_r$, i.e. that the number B is larger than the largest number that can be encoded with the r marks, then sub-step 425 recalculates the number B by subtracting the largest number that can be encoded with the r marks, i.e. $^zC_r$ from the number B, and sub-step 427 increments the number of marks r. The processor 205 returns control to sub-step 423 from where sub-steps 423 to 427 are repeated until the recalculated number B is smaller than $^zC_r$. In sub-step 429 the number marks r and the recalculated number B is then stored by the processor 205 in memory 206 for later use. The sub-steps of step 405 end in sub-step 429. The recalculated number B now represents the offset number.

Step 405 is followed by step 409 where the grid positions (i,j) for placing the r marks for encoding the number B are determined. Step 409 also includes a number of sub-steps, which are shown in a schematic flow diagram in FIG. 6. The sub-steps of step 409 starts in sub-step 430 where the following counters are set by the processor 205: p=1; t=0, and a=0. A counter q is also set equal to the number of marks r required to encode the (recalculated) number B, and counter ϵ is set equal to the number of positions z available for placing the r marks.

The processor 205 determines in sub-step 432 whether the counter q is equal to 0. If it is determined that the counter q is not equal to 0, then the positions of all r marks have not been determined and the processor 205 proceeds to sub-step 434 where the counter q is decremented.

The processor 205 decrements counter ϵ and increments counter t in sub-step 436. The processor 205 also calculates in step 438 a new value for counter a by adding $^ϵC_q$ to the previous value of counter a. This is followed by the processor 205 in sub-step 440 determining whether the counter a is smaller or equal to the (recalculated) number B. If the counter a is smaller or equal to the (recalculated) number B, then sub-steps 436 to 440 are repeated until the processor 205 determines in sub-step 440 that the counter a is larger than the (recalculated) number B, in which case the processor 205 in sub-step 442 calculates a new value for counter a by subtracting $^ϵC_q$ from the previous value of counter a. This is followed by sub-step 444 where the processor 205 sets a value for the $p^{th}$ position of a one dimensional array pos[p] as counter t. Thus, the $p^{th}$ mark of the r marks required to encode the number B is placed in position t of z possible positions. The processor 205 then increments counter p in sub-step 446 and passes control again to sub-step 432 from where steps 434 to 446 are repeated until it is determined in step 432 that counter q=0, i.e. that the positions pose[p] of all r marks have been determined, in which case the grid positions (i,j) are determined by the processor 205 from the one-dimensional array positions pos[p] in sub-step 448. The grid position (i,j) of the $p^{th}$ mark is:

(pos[pJ,0) if (pos[pJ<N−1)

(remainder(pos[pJ+1,N), quotient(pos[pJ+1,N)) if (pos[pJ<(N²−N−1)) and pos[p]>N−2

(remainder(pos[p]+1,N)+1,N−1) if (pos[p]>(N²−N−2))   (6)

This concludes the sub-steps of step 409.

Returning to FIG. 4, in a final sub-step 411 of step 706 marks are also added at the alignment mark grid positions (0;0), (0;N−1) and (N−1;0). This then also concludes the sub-steps of step 706.

Figure 9A:
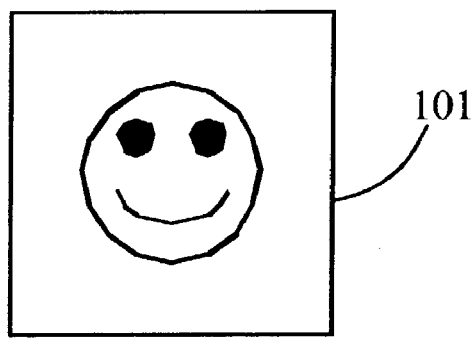
FIGS. 9A to 9F illustrate the steps of the process of watermarking an image with an encoded message by means of an example.
Figure 9B:
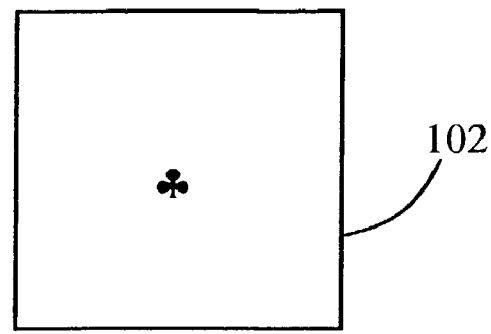

FIGS. 9A to 9F illustrate the steps of watermarking an image with an encoded message by means of a simplified example. FIG. 9A shows an image 101 into which a message "2Bit" is to be encoded using a watermark. FIG. 9B shows a simple basis pattern 102. In step 706 (FIG. 2), the message "2Bit" is used to determine the translations $(x_k, y_k)$ where copies of the basis pattern 102 are to be added using Equation (1) to form the watermark. In sub-step 401 (FIG. 4) and as is discussed in relation to Equation (2), the message "2Bit" may be converted into the decimal number 843213172.

Figure 9C:
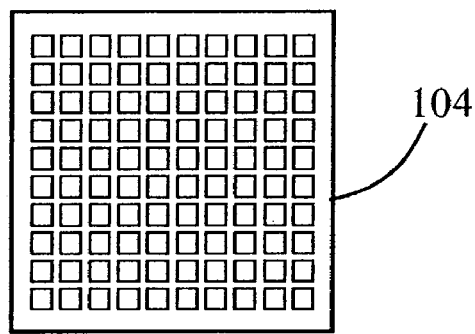
Figure 9D:
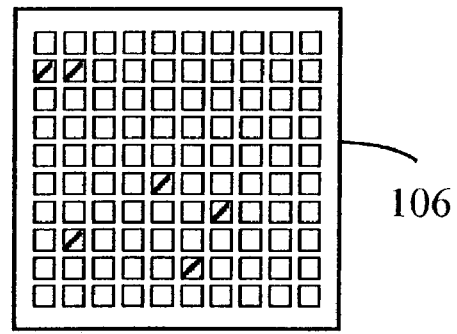

Sub-step 403 (FIG. 4) follows where the processor 205 defines a set of positions where the basis pattern 102 is to be added to the image 101. FIG. 9C shows a 10×10 grid, with the positions in the grid being identified by their respective array values (i;j), with i,jϵ0, . . . , 9 and grid position (0;0) being the lower left corner grid position. In the example alignment marks will not be used for simplicity. There are thus 100 positions provided for adding marks to encode the message.

With 100 positions, the number of marks required to encode the message is calculated by the processor 205 using the sub-step of step 405 (FIG. 5A) to be 6.

Step 409 (FIG. 4) follows where the grid positions (i,j) for placing the 6 marks for encoding the message are determined. The processor 205 calculates these positions to be (1,5), (2,1), (3,6), (4,4), (8,0), and (8,1) respectively using the sub-steps shown in FIG. 6.

Figure 9E:
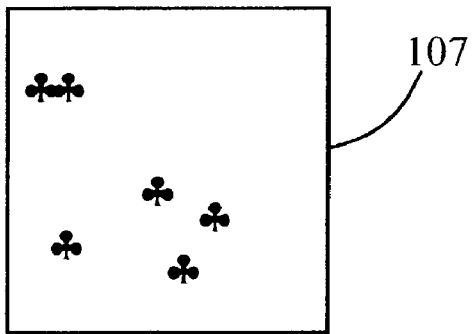
Figure 9F:
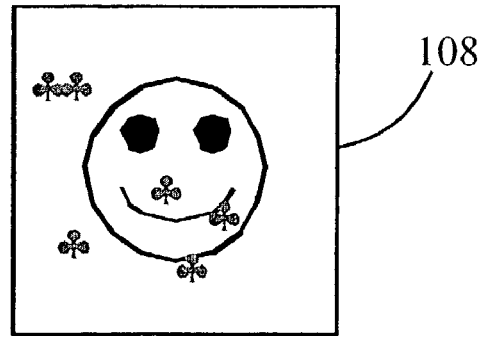

With the grid positions (i,j), a watermark 107 is formed, shown in FIG. 9E, by adding copies of the basis pattern 102 at each of the calculated positions. Finally, watermark 107 is added to the image 101 in step 727 (FIG. 2) to form a watermarked image 108 shown in FIG. 9F.

Figure 5B:
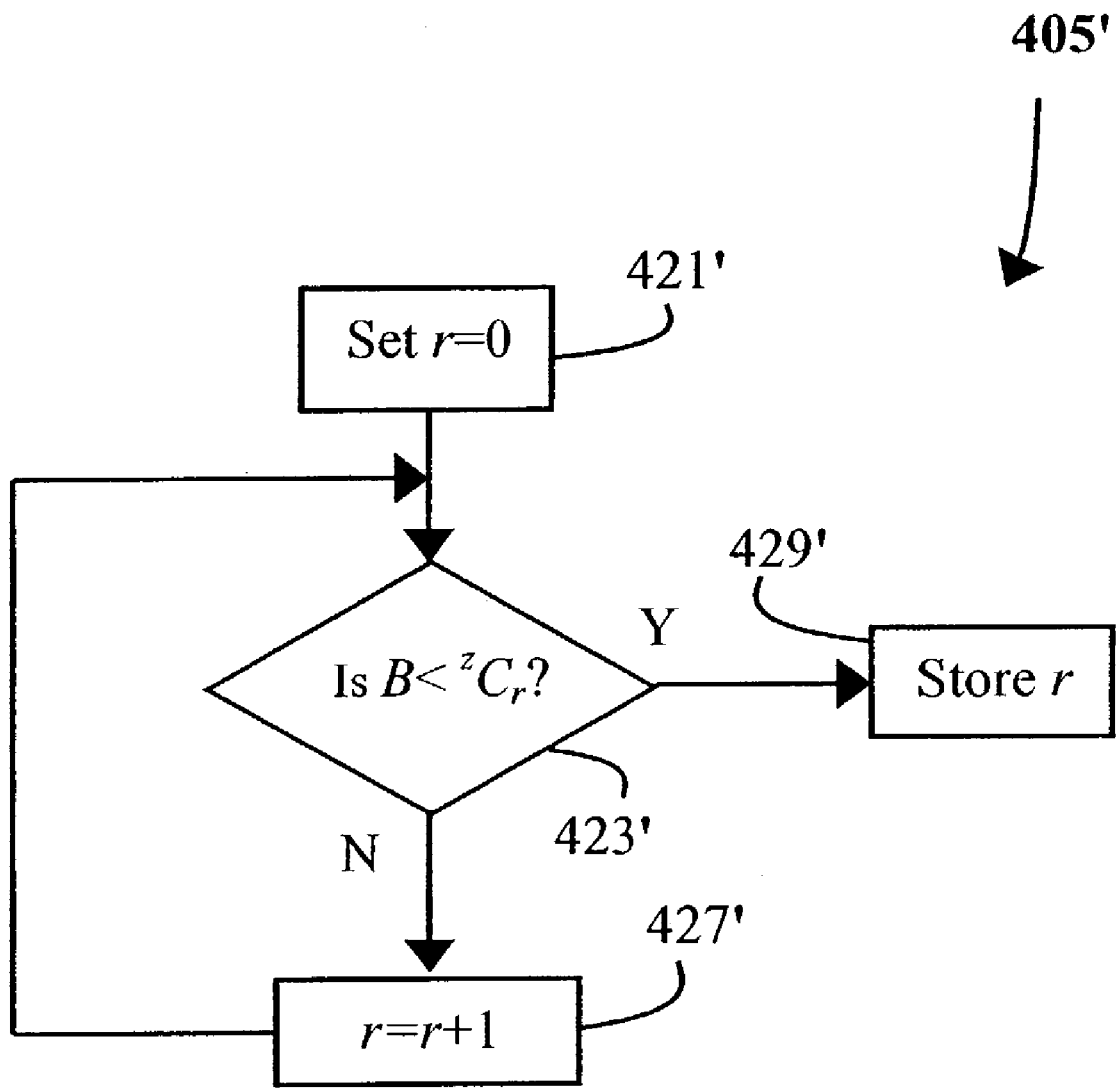

FIG. 5B shows a schematic flow diagram of an alternative implementation for step 405' where the number of marks r for encoding the number B with z available grid positions is determined by the processor 205. In this implementation, the number B is not recalculated, and the number B is encoded in step 409.

Step 405' starts in sub-step 421' where the number of marks r is initially set to 0. The processor 205 then determines in step 423' whether the number B is smaller than $^zC_r$, which is the largest number that can be encoded with the r marks. If it is determined in sub-step 423' that the number B is not smaller than $^zC_r$, then sub-step 427' increments the number of marks r. The processor 205 returns control to sub-step 423' from where sub-steps 423' to 427' are repeated until the recalculated number B is smaller than $^zC_r$. In sub-step 429' the number marks r is then stored by the processor 205 in memory 206 for later use. The sub-steps of step 405' end in sub-step 429'.

In yet a further implementation, the number of marks are not calculated as in steps 405 and 405', but predetermined by a user. In this implementation, it is necessary, in an alternative step 405" (not illustrated), after receiving the predetermined number of marks r from the user, to determine whether the predetermined number of marks r is above the minimum number of marks needed to encode the number B in z possible positions, which is $^zC_r$. If the number of marks r received from the user is below this minimum, an error message is given to the user, requesting the user to insert a higher number.

The use of the alignment marks will now be described in more detail before the decoding of a message embedded as a watermark will be described. As with many applications in machine and computer vision, encoding and then decoding information into a number of predetermined positions requires registration and alignment of the original positions with positions in a possibly transformed image.

Such alignment marks could take many forms. In the particular implementation described in relation to FIG. 4, three alignment marks are added to the image, with the copies of the basis pattern of the alignment marks being placing at image translations $(x_k, y_k)$ that correspond with grid positions (0;0), (0;N−1) and (N−1;0) of the N×N grid, thereby placing the alignment marks at the positions corresponding to three corners of the square grid of known size and forming an 'L'-shape.

The detection of the possibly transformed translations $(x_n, y_n)'$ of the alignment marks is performed by using process 900 described below in which a basis pattern g is correlated with an image containing the alignment mark. However, for a basis pattern g to form correlation peaks at transformed translations $(x_n, y_n)'$ of the alignment marks, the basis pattern g must correlate with a scaled and rotated version of itself such that the basis pattern equation γ from which the basis pattern g is formed has the property:

$$\gamma(r,\theta) \otimes \gamma(\alpha.r, \theta+\phi) = \{\gamma(r,\theta) \otimes \gamma(r,\theta)\} . c \quad (7)$$

wherein (r,θ) are the polar co-ordinates of a pixel, α is a positive real scaling factor, φ is a rotation angle, c is a complex number not dependent on either of the co-ordinates r or θ. The basis pattern g of the preferred implementation is in the form:

$$g_{mk}(x,y) = w(x,y) . |x^2 + y^2|^{(i\alpha_m + p)/2} e^{ik\theta} \quad (8)$$

with k, p and $\alpha_m$ being parameters of the basic pattern g, and w(x,y) is a window function. The window function w(x,y) may be used to remove or de-emphasise a central region of the basis pattern g having frequencies above a predetermined frequency. FIGS. 8A and 8B show the real and imaginary parts respectively of a typical basis pattern $g_{mk}$ with parameters k=50 and $\alpha_m \cong 50$. As the basis pattern $g_{mk}$ has negative values in its real and imaginary parts, the values of the basis pattern $g_{mk}$ have been normalised around a value of 127, with all values ranging from 0 to 255, 0 represented in black, 255 represented in white, and intermediate levels represented in levels of grey. Only the real part of the basis pattern $g_{mk}$ is used to form the watermark g' in step 710 (FIG. 2).

Once the possibly transformed translations $(x_n, y_n)'$ of the alignment marks are detected, a linear transformation to register the corresponding positions of the original and transformed images may be estimated as follows:

A rotation angle may be estimated using the vector between the two detected alignment mark translations $(x_n, y_n)'$ which are furthest apart. Similarly, a total scaling factor may be estimated using the distance between these two alignment mark translations $(x_n, y_n)'$. A shear factor may be estimated by measuring the angle between the three alignment mark translations $(x_n, y_n)'$. A change in aspect ratio may be estimated by measuring the difference in the length of the horizontal side and the vertical side of the "L" shape formed by the three alignment marks. The middle point of the 'L' shape may be used to define the coordinate system origin of the grid.

The four parameters (angle, scaling, shear and aspect ratio) completely define a linear transformation. Reflections and non-linear transformations such as warping or removal of image columns or rows can not be detected and therefore can not be inverted. The linear transformation may be inverted to restore the transformed image to its original size and orientation. The use of additional alignment marks can allow the inversion of reflections.

Scaling and rotation may be performed by a variety of resampling algorithms. Typically a high quality resampling using bi-cubic interpolation, Fourier interpolation, or even a non-linear resampling scheme may be used.

Registration may include focusing because the correlation magnitude peaks provide a nice smooth variation in magnitude with respect to changes in the focus of imaging systems. Focus can be estimated by correlation peak width. An advantage of a width based measure of focus is that it is normalised and does not depend upon the absolute peak level.

Registration may further include aspect ratio correction and shearing to some extent, due to the strength of the correlation magnitude peaks.

The sharpness and amplitude of detection magnitude peaks is not substantially affected by any rotation or scaling transformations applied to the image, although the position of the magnitude peaks themselves will be rotated and scaled with the watermarked image. Thus, any rotation or scaling can be detected and corrected for by using the position of alignment marks.

Figure 3:
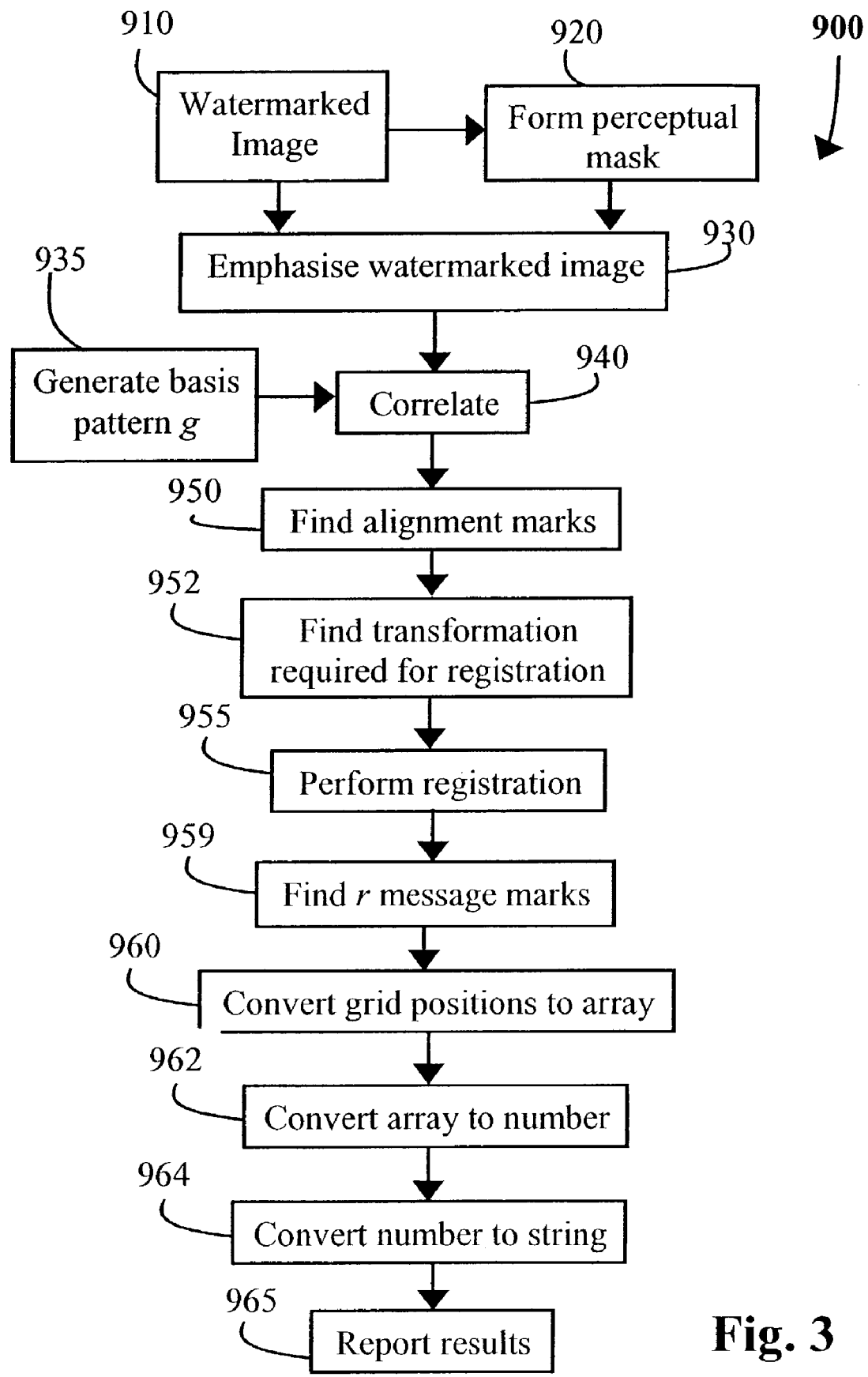
FIG. 3 shows a schematic diagram of a process of detecting a watermark in a watermarked image and decoding a message contained in the watermark.

FIG. 3 shows a flowchart of a process 900 of detecting a watermark in a watermarked image 910 and decoding a message contained in the watermarked image 910. The watermarked image 910 may be obtained by the system 200 using the digital capture device(s) 202 or through the storage device 209. The process 900 may also be implemented as software executing within the system 200, where the process 900 is effected by instructions in the software that are carried out by the processor 205 of the system 200.

One of the principle applications of correlation in image processing is in the area of template matching. Correlation is therefore used to detect the presence of a basis pattern g in an image f where:

$$f(x, y) = p(x, y) + \delta \cdot \sum_{k=1}^{K} g(x - x_k, y - y_k) \quad (9)$$

with p(x,y) being the image to which the watermark g' was embedded. Equation (9) does not represent perceptual masking. Correlation between the basis pattern g and image f produces an image h(x,y) with peak values at translations where the image f best matches the pattern g. The Fourier correlation theorem provides:

$$h(x,y) = f(x,y) \otimes g(x,y) \Leftrightarrow F^*(u,v) . G(u,v) = H(u,v) \quad (10)$$

Thus, correlation can be implemented by Fourier transforming the image f and the basis pattern g to obtain Fourier transformed functions F and G, complex conjugating one of the Fourier transformed functions, say F, and then multiplying these two functions F* and G, before transforming back.

It is also noted that:

$$h(x, y) = \left[ p(x, y) + \delta \cdot \sum_{k=1}^{K} g(x - x_k, y - y_k) \right] \otimes g(x, y) \quad (11)$$

$$= [p(x, y) \otimes g(x, y)] +$$

$$\left[ \delta \cdot \sum_{k=1}^{K} g(x - x_k, y - y_k) \otimes g(x, y) \right]$$

Image $h(x,y)$ thus comprises values as a result of the cross-correlation between image p and basis pattern g, which with natural occurring image p should have low values, and as a result of the auto-correlation of basis pattern g. If the basis pattern g is chosen to be a wideband signal, then the auto-correlation will provide K sharp peaks at translations $(x_k, y_k)$. Basis patterns with the form defined in Equation (8) have the further advantageous property that sharp magnitude peaks result from the correlation of the basis pattern with the real part of the basis pattern.

Returning to process 900, in step 920 the processor 205 calculates a perceptual mask w'(x,y) from the watermarked image 910. The perceptual mask w'(x,y) is calculated in the same manner as the perceptual mask w(x,y) was calculated in step 720 (FIG. 2). In step 930 the processor 205 emphasises the watermarked image 910 with the perceptual mask w'(x,y) by dividing the pixel values of the watermarked image 910 by pixel values of corresponding pixels of the perceptual mask. This step reduces the level of the original image p(x,y), which reduces the correlation of the original image p(x,y) with the basis pattern g in step 940 that follows. The emphasised image is then correlated in step 940 with the basis pattern g, which is preferably mathematically generated by the processor 205 through the use of the basis pattern equation and parameters of the basis pattern in step 935.

If the basis pattern g is present in the watermarked image 910, then the image resulting from the correlation step 940 will have correlation magnitude peak(s) at translation(s) $(x_k, y_k)'$ where that basis pattern g was embedded into the watermarked image 910. Thus, even though the watermark g' is imperceptibly added to the image 700, correlation of the image 700 with the correct basis pattern g provides the retrieval of the translation(s) $(x_k, y_k)'$ with high accuracy.

In addition to the conventional correlation process outlined above, enhanced forms of correlation may also be usefully employed for the detection of embedded patterns. One form of enhanced correlation is known as "phase-only" correlation. Phase only correlation is implemented by taking the Fourier correlation magnitude, and setting it to unity before applying the inverse Fourier transform. This ensures that only the phase terms of the frequencies in the Fourier domain contribute to the overall correlation peak.

In yet another implementation, the correlation is performed optically through the use of spatial light modulators (not illustrated).

The correlation magnitude peak(s) at translation(s) $(x_k, y_k)'$ include those added as a result of the three alignment marks, r message marks, and a mark indicating the value of r. By ensuring that the r message marks and the mark indicating the value of r are kept completely inside the square defined by the three alignment marks, as was done in the process 750 (FIG. 2), the alignment marks may be distinguished from any other marks by finding a bounding box around the detected correlation magnitude peaks, and then selecting the three points furthest from the centre of the bounding box.

Alternatively, a more sophisticated method may be used that searches a larger set of detected correlation magnitude peaks for groups of three peaks that are close to the form of three corners of a square, and discounts any false peaks that have been incorrectly detected.

Using any one of the methods set out above, the processor 205 finds the alignment marks in step 950 and determines in step 952 the linear transformation required to register translations $(x_k, y_k)'$ of the watermarked image 910 with the translations (x,y) of the image 700 to which the watermark was added. The image resulting from the correlation is transformed in step 955 as set out above in relation to alignment marks.

With the translations of the correlation peaks registered, the translations of the detected alignment marks corresponds to grid positions (0;0), (0;N−1) and (N−1;0) of the N×N grid. The grid positions of the r message marks may also be found in step 959 respectively.

Because the spatial transformation of the transformed watermarked image may affect the accuracy of detected translations of the correlation magnitude peaks, it may be useful to register the watermarked image 910 using the computed transformation parameters and to correlate the transformed watermarked image 910 to find the r message marks more accurately.

The processor 205 converts the grid positions (i,j) of the r message marks in step 960 to a one-dimensional array pos'[p], with p∈1, . . . , r. For example, with the $p^{th}$ message mark being on grid position (i,j), the value of array pos'[p] is:

i if j=0 j×N+i−1 if 0<j<N−1 j×N+i−2 if j=N−1   (12)

The above numbering system explicitly excludes the alignment marks from the numbering.

The processor 204 then converts the array pos'[p] to a number B' in step 962 and converts the number B' to a string in step 964. For example, the binary number:

01000010 01101111 01100010$_2$   (13)

and using the ASCII code, is converted to the string "Bob". The result is reported in step 965 by the processor 205 by displaying the string on the output device 215.

Step 962 will now be described with reference to the schematic flow diagrams in FIGS. 7A and 7B. Step 962 shown in the schematic flow diagram of FIG. 7A must be used when the sub-steps of step 405 shown in FIG. 5A was used to calculate the number of message marks r, as the number B is recalculated therein, causing only the offset to be encoded by the placement of the marks, while the lower bound is encoded in the number of marks r. Step 962' shown in the schematic flow diagram of FIG. 7B must be used when the sub-steps of step 405' shown in FIG. 5B was used to calculate the number of message marks r. In that implementation, the number B is encoded by the placement of the r marks.

Figure 7A:
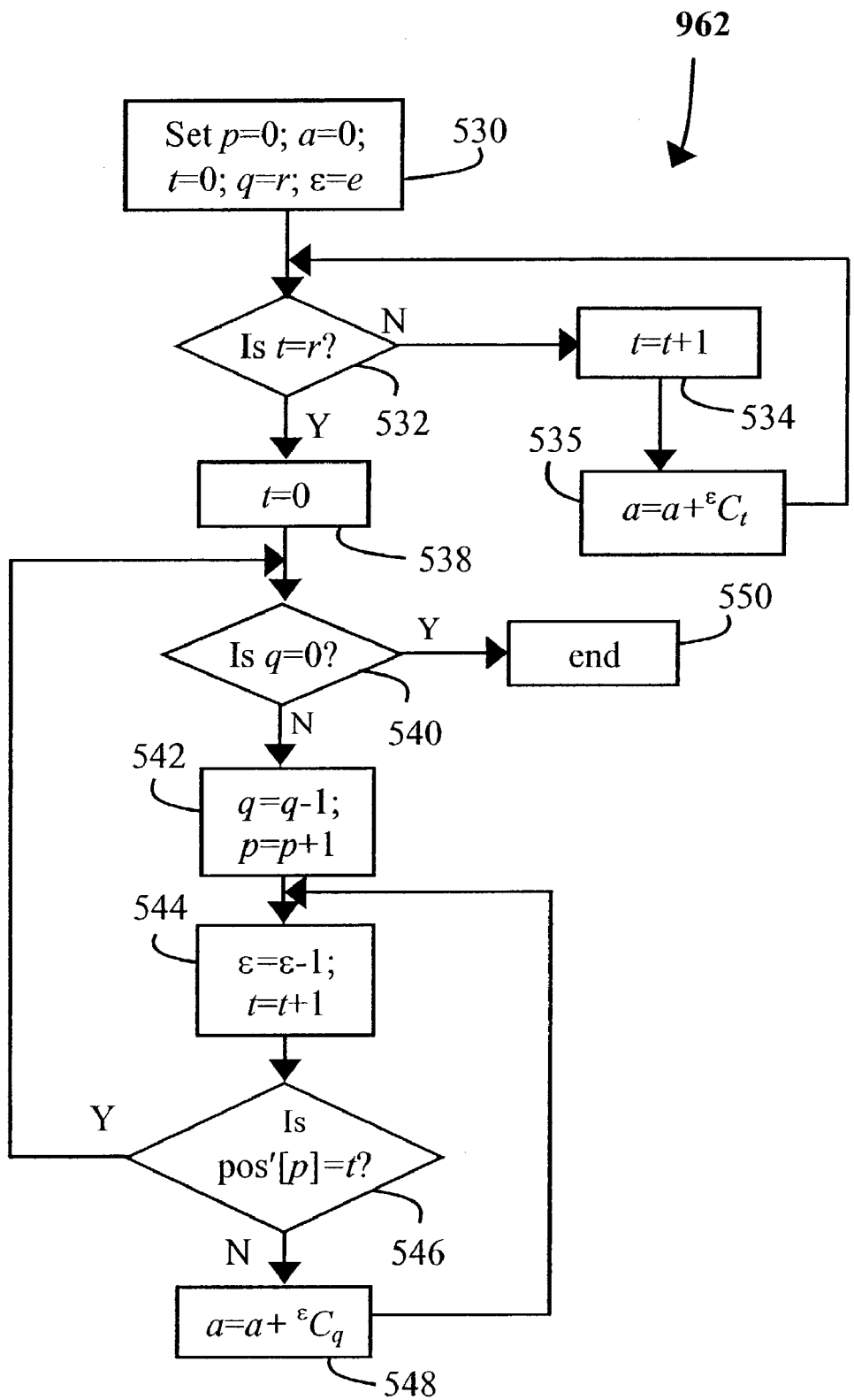
FIGS. 7A and 7B show schematic diagrams of the steps to convert an array representing the positions of detected marks into a number.

Referring to FIG. 7A, the sub-steps of step 962 starts in sub-step 530 where the following counters are set by the processor 205: p=1; t=0, and a=0. A counter q is also set equal to the number of marks r, and counter ε is set equal to the number of positions z available for placing marks.

The processor 205 determines in sub-step 532 whether the counter t is equal to the number of message marks r. If it is determined that the counter t is not equal to the number of message marks r, then the processor 205 proceeds to sub-step 534 where the counter t is incremented. The processor 205 also calculates a new value for counter a in sub-step 535 by adding $^\epsilon C_t$ to the previous value of counter q, and returns control to step 532.

Sub-steps 532 to 535 are repeated until the processor 205 determines in sub-step 532 that the counter t is equal to the number of message marks r. Counter a now has the value of the lower bound of number B'. The processor 205 then proceeds to sub-step 538 where the counter t is set to 0. This is followed by the processor 205 in sub-step 540 determining whether the counter q is equal to zero. If the counter a is not equal to zero, then the processor 205 proceeds to sub-step 542 where counter q is decremented and counter p is incremented.

This is followed by sub-step 544 where the processor 205 increments counter t decrements counter $\epsilon$. The processor 205 determines then in sub-step 546 whether the value for the $p^{th}$ position of the one dimensional array pos'[p] is equal to the counter t. If the value for the $p^{th}$ position of the one dimensional array pos'[p] is equal to the counter t, then control is returned to sub-step 540. Alternatively, if the value for the $p^{th}$ position of the one dimensional array pos'[p] is not equal to the counter t, then the processor 205 calculates a new value for counter a in step 548 by adding $^\epsilon C_q$ to the previous value of counter a, and returns control to step-sub 544.

Once the processor 205 determines in sub-step 540 that counter q is equal to zero, the sub-steps of step 962 ends in sub-step 550. The value of counter a now represents the number B'.

Figure 7B:
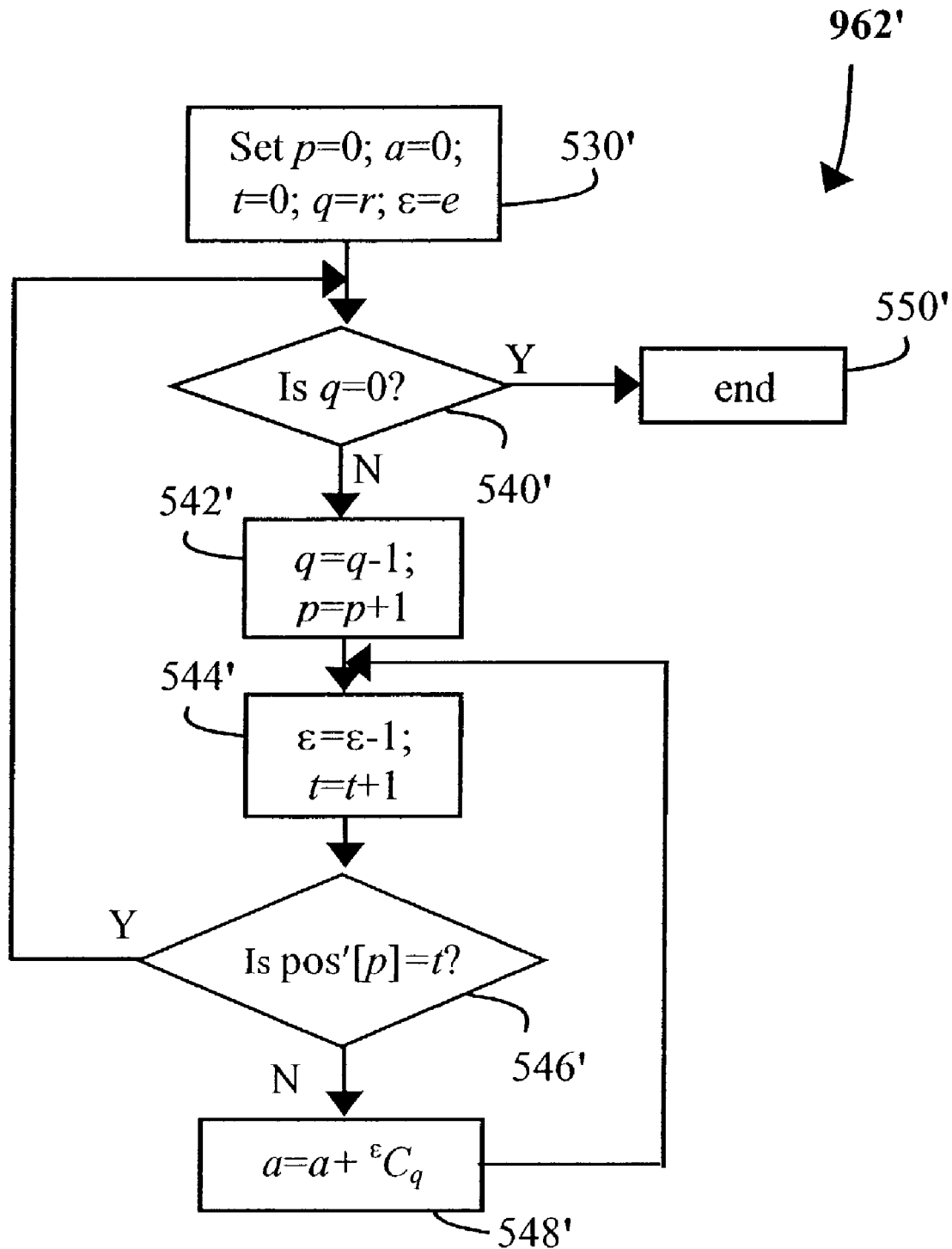

Referring now to FIG. 7B, where the sub-steps of the alternative step 962' (useable with FIG. 5B) is shown. Step 962' starts in sub-step 530' where the following counters are set by the processor 205: p=1; t=0, and a=0. A counter q is also set equal to the number of marks r, and counter $\epsilon$ is set equal to the number of positions z available for placing marks.

This is followed by the processor 205 in sub-step 540' determining whether the counter q is equal to zero. If the counter q is not equal to zero, then the processor 205 proceeds to sub-step 542' where counter q is decremented and counter p is incremented.

This is followed by sub-step 544' where the processor 205 increments counter t and decrements counter $\epsilon$. The processor 205 determines then in sub-step 546' whether the value for the $p^{th}$ position of the one dimensional array pos'[p] is equal to the counter t. If the value for the $p^{th}$ position of the one dimensional array pos'[p] is equal to the counter t, then control is returned to sub-step 540'. Alternatively, if the value for the $p^{th}$ position of the one dimensional array pos'[p] is not equal to the counter t, then the processor 205 calculates a new value for counter a in step 548' by adding $^\epsilon C_q$ to the previous value of counter a, and returns control to sub-step 544'.

Once the processor 205 determines in sub-step 540' that counter q is equal to zero, the sub-steps of step 962' ends in sub-step 550'. The value of counter a now represents the number B'.

Without changing the essential character of process 750 and 900, a number of refinements may be used to improve the efficacies thereof.

Under certain conditions, the intensity of the correlation magnitude peaks corresponding to the watermark g' will be greatly reduced. Under these conditions, it is hard or impossible to totally distinguish actual correlation peaks from peaks that are a result of noise. A preferred method used to alleviate this problem is to add a single extra mark in an extra set of grid positions to indicate the number of marks r used to encode the number in the image 700, thereby enabling a decoder to at least know how many correlation magnitude peaks to search for. Alternatively the extra mark may be added on the grid by placing the extra mark in the grid position (0;r), and leaving all grid positions between (0;0) and (0;r) empty. Subsequent marks in the grid encode the message 705. Encoding the number of correlation magnitude peaks in this manner leaves $z=N^2-4-r$ positions for encoding the number B.

If the length b of the number B is fixed, the number of marks r required for encoding the number B is also fixed. In such cases it is not necessary to indicate the number of marks as set out above, as a corresponding decoding program would know the total number of marks K to search for.

In a second refinement, the pixel values of each basis pattern g is multiplied by a separate scaling constant when the watermark g' is formed in step 710 (FIG. 2). The separate scaling constant for each copy of the basis pattern g is chosen such that the detectability of all the copies are normalised. Accordingly, copies of the basis pattern to be added closer to the edge of the image 700 image and which would therefore be trimmed when it is added onto the image 700 may be scaled slightly higher than those copies that would be complete when added to the image 700.

Figure 6:
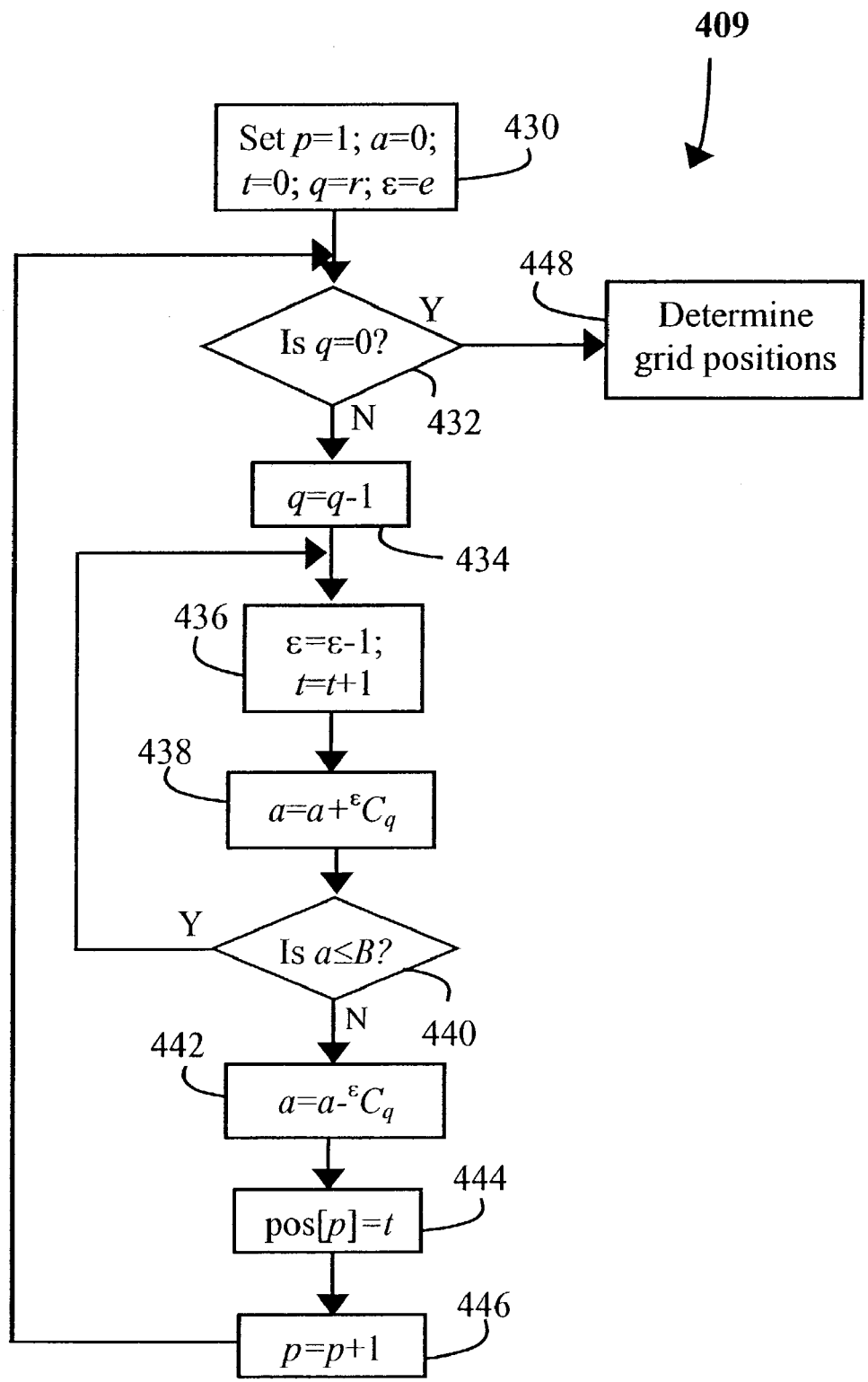
FIG. 6 shows a schematic diagram of the steps to determine the positions for placing the marks for encoding the number.

It is desirable for the r message marks not to be placed to close to each other, thereby ensuring that the marks are more distinguishable after the correlation step 940. In a third refinement a neighbourhood of subsequent grid positions is excluded when the grid positions (i,j) are determined by the processor 205 from the one-dimensional array positions pos[p] in step 448 (FIG. 6). For example, if the 10 grid positions (i,j) surrounding a mark grid positions (i,j) are excluded, then the number of combinations available is reduced from $^zC_r$ to $^{z-9r}C_r$. This exclusion has a negligible effect on the total length of message that may be encoded. The positions that are excluded during encoding must also be excluded during decoding.

In a fourth refinement, multiple basis patterns are used, with each basis pattern orthogonal to all other basis patterns. For example, if the basis patterns used have the form of Equation (8), different basis patterns that are orthogonal to all other basis patterns may be generated by choosing different parameters k, p and/or $\alpha_m$ or each pattern. In this case, multiple marks but from different basis patterns may be added to the same grid position (i,j) while remaining separately detectable.

In the implementation described, a rather trivial mapping is used between the rectangular grid positions and the one dimensional array pos[p], which is performed in step 448 (FIG. 6), in that the mapping is sequential. The message may be encrypted by employing a more sophisticated mapping between the rectangular grid positions and the one dimensional array pos[p]. For example, the mapping may be pseudo-random, with the seed (or key) and the random number generator known only to the encoder and the decoder of the message.

Furthermore, the positions for placing the marks, which are defined in step 403 (FIG. 4) do not have to be on a rectangular grid. Some examples of different position definitions are:

a space filling curve, e.g. the Peano curve; and a spiral, with array pos[1] in the center of the spiral and array pos[p] for larger p values occurring nearer the outside of the spiral.

In yet another implementation a hexagonal position grid is used, thereby ensuring adjacent positions are spaced more optimally, thus allowing a larger number of positions to be packed into a smallest space.

Figure 4:
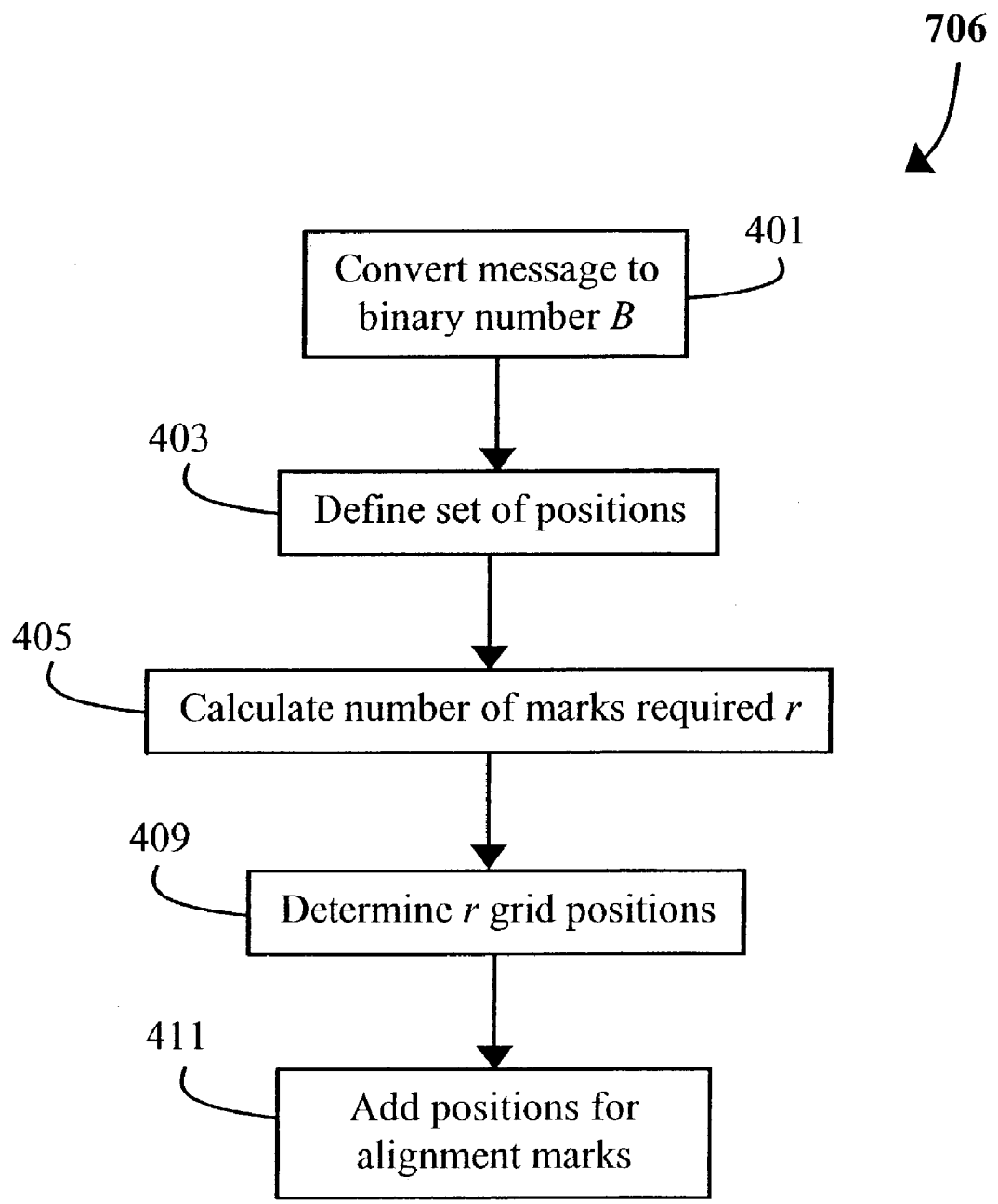
FIG. 4 shows a schematic diagram of the steps to determine locations where basis patterns forming the watermark are to be placed in the image.

In yet further refinements, provision is made for message verification and error correction. One method of verifying that the message has been decoded accurately is to incorporate a checksum into the number B when the message is converted to the number B in step 401 (FIG. 4). This will increase the length of the number B somewhat, but provides a way for a decoder to increase the certainty that the message has been decoded accurately. For example, by adding a checksum to a 10 bit number B, a successful decoding will have a likelihood of error of only $2^{-10}$, or $10^{-3}$.

Adding a checksum will not increase the robustness of the message encoded using the watermark, but only increases the confidence that the message has been decoded successfully. To increase the robustness of the message, error correcting codes can be used.

Because the process 750 of encoding a message 705 into an image 700 does not store the message directly in binary, it is not possible to use standard error correcting codes. However, by encoding several separate messages using disjoint subsets of positions, it is possible to introduce redundancy into the encoding so that if one or more of the sub-messages is corrupted, then the full message may still be recovered.

For example, assume that the message has been converted to a number B having a length of 64 bits. With a 45×45 grid, and using 2000 possible position of that grid, step 405 (FIG. 5A) calculates that 7 message marks are required. However, if any error were to occur with any of the 7 message marks, the message would not be recoverable. By storing the message redundantly across several groups of the 2000 possible positions, the chances of both detecting and correcting errors correctly are greatly increased.

Two methods can be used for partitioning groups of the possible positions.

If the number of possible positions z is large, disjoint subsets of these possible positions may be assigned to different groups of positions. Using a single basis pattern g for encoding, the message, or parts of the message, may then be repeated in the different groups of possible positions. For example, with 2000 possible positions, 4 groups of 500 positions may be formed. If it is further decided to only use three message marks within each group, thereby using a total of 12 message marks instead of 7 message marks will be used. Three message marks in 500 possible positions allows 25 bits to be encoded in each group. If the 64 bit number B is split into three parts A, B, and C having lengths of 20, 22 and 22 bits respectively, within the four groups A, B, C, and A*B*C (where * is the exclusive-or operator) may be encoded, with each group having a 3-bit checksum added. This checksum will give around 88% probability of detecting an error in any of the four groups.

The number B may be retrieved from any three of the four groups as follows:

A,B,C: number B is (ABC)
A,B,A*B*C: C=(A*B)*(A*B*C)
A,A*B*C,C: B=(A*C)*(A*B*C)
A*B*C,B,C: A=(A*C)*(A*B*C)

If no checksum error is detected in any of the groups, then the message may be decoded from any three of the groups.

By decoding the message twice, using two sets of groups, it is possible to verify that the decoding was accurate: it is extremely unlikely (chances smaller than $10^{-7}$) that errors occurred in two or more groups, with correct checksums, with two erroneous messages decoding to identical messages.

If a checksum error is detected in one of the groups, the other three groups may be used for decoding the message. In this case, an error in any of the three remaining groups will have a relatively large chance (12%) of being undetected, and hence causing an undetected decoding error.

If a checksum error is detected in more than one group, it will not be possible to decode any message.

Alternatively, by using multiple different basis patterns $g_i$, the same set of grid positions may be used with each basis pattern $g_i$ for encoding the message multiple times. Each copy of the message is independently decoded by correlating the watermarked image with the respective basis patterns $g_i$.

In yet another refinement, separate basis patterns are used for the alignment marks and the message marks. If the alignment marks are encoded using their own basis pattern, then the decoder may simply look for exactly three peaks in the alignment pattern, removing the chance of message marks being mistaken for alignment marks.

If decoding time is not an important consideration, a separate basis pattern $g_i$ may be used for each individual message mark. This would completely remove any interference between message marks, giving a slightly improved chance of watermark detection and decoding the message.

With little modification, processes 750 and 900 may also be applied to digital data other than two-dimensional images. In one implementation processes 750 and 900 are implemented to one-dimensional audio data. Instead of using two-dimensional data arrays (images), basis patterns and correlations, all the processing is performed using one-dimensional audio data, basis patterns and correlations. Instead of using a set of grid positions for placing marks in a two-dimensional image, a set of time positions of the audio data may be used to define the positions where marks are placed in the audio data. Furthermore, instead of using an alignment pattern consisting of three points to define a two-dimensional coordinate system, two copies of a basis pattern placed at the start and end points of the watermark may be used to define the set of time positions used for the message marks. If the pitch of the audio data is modified by resampling, the time distance between mark positions will change, but using the alignment marks, the change may be reversed by a simple scaling.

Processes 750 and 900 may also be applied to a sequence of images, such as video, forming a three-dimensional data set. In such an implementation the positions for placing marks may for a three-dimensional grid. Marks are added and detected in the images of the sequence in the manner described in relation to single images.

The foregoing describes only some implementations, and modifications and/or changes can be made thereto without departing from the scope and spirit of the invention, the implementation(s) being illustrative and not restrictive. For example, one or more of the processes 750 and 900 may be implemented in dedicated hardware such as one or more integrated circuits performing the functions or sub functions of those processes 750 and 900. Such dedicated hardware may include graphic processors, digital signal processors, or one or more microprocessors and associated memories.

We claim:

1. A method of encoding a value, said method comprising the steps of:
   a) defining a first ordered set of positions;
   b) determining a number of marks for encoding said value in said ordered set of positions;
   c) determining a selection of said first ordered set of positions using combinatorial analysis with said number of marks and the number of positions in said first ordered set of positions for encoding said value; and
   d) placing marks at said selection of said first ordered set of positions.

2. A method as claimed in claim 1 comprising the further steps of:
   e) defining a second ordered set of positions; and
   f) placing a further mark at one of said second ordered set of positions for encoding said number of marks used for encoding said value.

3. A method as claimed in claim 1 comprising the further steps of:
   g) defining alignment mark positions, said alignment mark positions having a predefined relationship with said ordered set(s) of positions; and
   h) placing further marks at said alignment mark positions.

4. A method as claimed in claim 3 wherein a predetermined number of alignment mark positions are defined at positions bordering said ordered set(s) of positions.

5. A method as claimed in claim 1, wherein said value is encoded by encoding a base value and an offset value, said base value is encoded by said number of marks, and said offset value is encoded by said selection of positions.

6. A method as claimed in claim 5, wherein said number of marks determined in step (b) is the smallest number r that satisfies $$B \leq \sum_{i=0}^{r} \frac{z!}{i!(z-i)!},$$

wherein B is said value and z is the number of positions in said first ordered set of positions, said base value is $$\sum_{i=0}^{r-1} \frac{z!}{i!(z-i)!}$$

and said offset value is $$\sum_{i=0}^{r-1} \frac{z!}{i!(z-i)!}.$$

7. A method as claimed in claim 1, wherein said number of marks determined in step (b) is the smallest number r that satisfies $$B \leq \frac{z!}{r!(z-r)!},$$

wherein B is said value and z is the number of positions in said first ordered set of positions.

8. A method as claimed in claim 1 wherein said ordered set(s) of positions is defined in at least one image.

9. A method as claimed in claim 8 wherein said first ordered set of positions is points of a rectangular grid.

10. A method as claimed in claim 8 wherein said first ordered set of positions is points on a spiral.

11. A method as claimed in claim 8 wherein said first ordered set of positions is points on a space filling curve.

12. A method as claimed in claim 8 wherein said first ordered set of positions is points on a hexagonal grid.

13. A method as claimed in claim 1 wherein said ordered set(s) of positions is defined in an audio stream.

14. A method as claimed in claim 1 wherein said step (d) of placing marks at said selection of said first ordered set of positions comprises the sub-steps of: d1) maintaining at least one basis pattern; and d2) adding said basis pattern at said selection of positions.

15. A method of decoding a value encoded by placing marks at positions selected from a first ordered set of positions, said method comprising the steps of:
   a) identifying said first ordered set of positions;
   b) detecting said marks at said positions; and
   c) decoding said value using combinatorial analysis with the number of marks detected and the number of positions in said first ordered set of positions.

16. A method as claimed in claim 15 wherein step b) comprises the further steps of: b1) identifying a second ordered set of positions; b2) detecting a further mark at one of said second ordered set of positions; b3) decoding, from said further mark in said second ordered set of positions said number of marks at selected positions from said first ordered set of positions; and b4) detecting said number of marks at selected positions from said first ordered set of positions starting from marks having highest magnitude.

17. A method as claimed in claim 15 comprising the initial step of detecting alignment marks, said alignment marks having positions with a predefined relationship with said ordered set(s) of positions, thereby aiding identifying said ordered set(s) of positions.

18. A method as claimed in claim 15 wherein said ordered set(s) of positions is defined in at least one image.

19. A method as claimed in claim 18 comprising the initial steps of: maintaining a basis pattern; and correlating said image(s) with said basis pattern to form correlation peaks, wherein said correlation peaks are said marks.

20. A method as claimed in claim 18 wherein said first ordered set of positions is points of a rectangular grid.

21. A method as claimed in claim 18 wherein said first ordered set of positions is points on a spiral.

22. A method as claimed in claim 18 wherein said first ordered set of positions is points on a space filling curve.

23. A method as claimed in claim 18 wherein said first ordered set of positions is points on a hexagonal grid.

24. A method as claimed in claim 15 wherein said ordered set(s) of positions is defined in an audio stream and said method comprises the initial steps of: maintaining a basis pattern; and correlating said audio stream with said basis pattern to form correlation peaks, wherein said correlation peaks are said marks.

25. An apparatus for encoding a value, said apparatus comprising: means for defining a first ordered set of positions; means for determining a number of marks for encoding said value in said ordered set of positions;
   means for determining a selection of said first ordered set of positions using combinatorial analysis theory with said number of marks and the number of positions in said first ordered set of positions for encoding said value; and means for placing marks at said selection of said first ordered set of positions.

26. An apparatus as claimed in claim 25 further comprising: means for defining a second ordered set of positions; and means for placing a further mark at one of said second ordered set of positions for encoding said number of marks used for encoding said value.

27. An apparatus as claimed in claim 25 further comprising: means for defining alignment mark positions, said alignment mark positions having a predefined relationship with said ordered set(s) of positions; and means for placing further marks at said alignment mark positions.

28. An apparatus as claimed in claim 27 wherein a predetermined number of alignment mark positions are defined at positions bordering said ordered set(s) of positions.

29. An apparatus as claimed in claim 25, wherein said value is encoded by encoding a base value and an offset value, said base value is encoded by said number of marks, and said offset value is encoded by said selection of positions.

30. An apparatus as claimed in claim 29, wherein said number of marks is the smallest number r that satisfies $$B \le \sum_{i=0}^{r} \frac{z!}{i!(z-i)!},$$

wherein B is said value and z is the number of positions in said first ordered set of positions, said base value is $$\sum_{i=0}^{r} \frac{z!}{i!(z-i)!}$$

and said offset value is $$\sum_{i=0}^{r-1} \frac{z!}{i!(z-i)!}.$$

31. An apparatus as claimed in claim 25, wherein said number of marks is the smallest number r that satisfies $$B \le \frac{z!}{r!(z-r)!},$$

wherein B is said value and z is the number of positions in said first ordered set of positions.

32. An apparatus as claimed in claim 25 wherein said ordered set(s) of positions is defined in at least one image.

33. An apparatus as claimed in claim 25 wherein said ordered set(s) of positions is defined in an audio stream.

34. An apparatus as claimed in claim 25 wherein marks are placed at said selection of said first ordered set of positions by adding a basis pattern at said selection of positions.

35. An apparatus for decoding a value encoded by placing marks at positions selected from a first ordered set of positions, said apparatus comprising:

means for identifying said first ordered set of positions;

means for detecting said marks at said positions; and means for decoding said value using combinatorial analysis with the number of marks detected and the number of positions in said first ordered set of positions.

36. An apparatus as claimed in claim 35 wherein said means for detecting comprises: means for identifying a second ordered set of positions; means for detecting a further mark at one of said second ordered set of positions; means for decoding, from said further mark in said second ordered set of positions said number of marks at selected positions from said first ordered set of positions; and means for detecting said number of marks at selected positions from said first ordered set of positions starting from marks having highest magnitude.

37. An apparatus as claimed in claim 35 further comprising means for detecting alignment marks, alignment marks having positions with a predefined relationship with said ordered set(s) of positions, thereby aiding identifying said ordered set(s) of positions.

38. An apparatus as claimed in claim 35 wherein said ordered set(s) of positions is defined in at least one image.

39. An apparatus as claimed in claim 38 further comprising means for correlating said image(s) with a basis pattern to form correlation peaks, wherein said correlation peaks are said marks.

40. An apparatus as claimed in claim 35 wherein said ordered set(s) of positions is defined in an audio stream and said apparatus further comprises means for correlating said audio stream with a basis pattern to form correlation peaks, wherein said correlation peaks are said marks.

41. A program stored on a computer readable medium for encoding a value, said program comprising:

code for defining a first ordered set of positions;

code for determining a number of marks for encoding said value in said ordered set of positions; code for determining a selection of said first ordered set of positions using combinatorial analysis with said number of marks and the number of positions in said first ordered set of positions for encoding said value; and code for placing marks at said selection of said first ordered set of positions.

42. A program as claimed in claim 41 further comprising: code for defining a second ordered set of positions; and code for placing a further mark at one of said second ordered set of positions for encoding said number of marks used for encoding said value.

43. A program as claimed in claim 41 further comprising: code for defining alignment mark positions, said alignment mark positions having a predefined relationship with said ordered set(s) of positions; and code for placing further marks at said alignment mark positions.

44. A program as claimed in claim 42, wherein said value is encoded by encoding a base value and an offset value, said base value is encoded by said number of marks, and said offset value is encoded by said selection of positions.

45. A program as claimed in claim 44, wherein said number of marks is the smallest number r that satisfies $$B \le \sum_{i=0}^{r} \frac{z!}{i!(z-i)!},$$

wherein B is said value and z is the number of positions in said first ordered set of positions, said base value is $$\sum_{i=0}^{r} \frac{z!}{i!(z-i)!}$$

and said offset value is $$\sum_{i=0}^{r-1} \frac{z!}{i!(z-i)!}.$$

46. A program as claimed in claim 41, wherein said number of marks is the smallest number r that satisfies $$B \le \frac{z!}{r!(z-r)!},$$

wherein B is said value and z is the number of positions in said first ordered set of positions.

47. A program as claimed in claim 41 wherein said ordered set(s) of positions is defined in at least one image.

48. A program as claimed in claim 41 wherein said ordered set(s) of positions is defined in an audio stream.

49. A program stored on a memory computer readable for decoding a value encoded by placing marks at positions selected from a first ordered set of positions, said program comprising:
  code for identifying said first ordered set of positions;
  code for detecting said marks at said positions; and
  code for decoding said value using combinatorial analysis with the number of marks detected and the number of positions in said first ordered set of positions.

50. A program as claimed in claim 49 wherein said code for detecting comprises: code for identifying a second ordered set of positions; code for detecting a further mark at one of said second ordered set of positions; code for decoding, from said further mark in said second ordered set of positions said number of marks at selected positions from said first ordered set of positions; and code for detecting said number of marks at selected positions from said first ordered set of positions starting from marks having highest magnitude.

51. A program as claimed in claim 49 further comprising code for detecting alignment marks, said alignment marks having positions with a predefined relationship with said ordered set(s) of positions, thereby aiding identifying said ordered set(s) of positions.

52. A program as claimed in claim 49 wherein said ordered set(s) of positions is defined in at least one image.

53. A program as claimed in claim 52 further comprising code for correlating said image(s) with a basis pattern to form correlation peaks, wherein said correlation peaks are said marks.

54. A program as claimed in claim 49 wherein said ordered set(s) of positions is defined in an audio stream and said program further comprises code for correlating said audio stream with a basis pattern to form correlation peaks, wherein said correlation peaks are said marks.

* * * * *